United States Patent [19]
Ratcliff

[11] 3,809,426

[45] May 7, 1974

[54] MECHANISM FOR RAISING AND LOWERING TELESCOPIC TRAVEL TRAILER

[75] Inventor: Rudy J. Ratcliff, Marengo, Ill.

[73] Assignee: Ratcliff Industries, Inc., Juneau, Wis.

[22] Filed: Aug. 28, 1972

[21] Appl. No.: 284,341

[52] U.S. Cl. .................................. 296/27, 254/148
[51] Int. Cl. .............................................. B60p 3/34
[58] Field of Search .................. 296/23 R, 23 C, 27; 254/148

[56] References Cited
UNITED STATES PATENTS

| | | | |
|---|---|---|---|
| 3,490,807 | 1/1970 | Sare | 296/23 R |
| 3,403,936 | 10/1968 | Young | 296/27 |
| 3,323,778 | 6/1967 | Baker | 296/23 R X |

*Primary Examiner*—Philip Goodman
*Attorney, Agent, or Firm*—Andrus, Sceales, Starke & Sawall

[57] ABSTRACT

A mechanism for raising and lowering a telescopic travel trailer. The travel trailer includes a lower trailer section and an upper trailer section that telescopes vertically with respect to the lower section from a retracted position for transporting to a raised position for camping. The upper trailer section is raised and lowered by a hand wheel connected to a shaft that extends longitudinally of the lower section and the shaft is connected by cables to the upper trailer section. Rotation of the shaft in one direction through use of the hand wheel will cause the cables to wind on the shaft to raise the upper trailer section, while winding the shaft in the opposite direction will permit the upper trailer section to lower. To counterbalance the weight of the upper trailer section, a pair of springs are mounted on the frame of the lower trailer section and are connected by cables to the shaft in a manner such that when the upper trailer section is in the lower position the springs are extended, and as the upper trailer section is raised, the force of the springs acts to aid in raising the upper trailer section.

7 Claims, 7 Drawing Figures

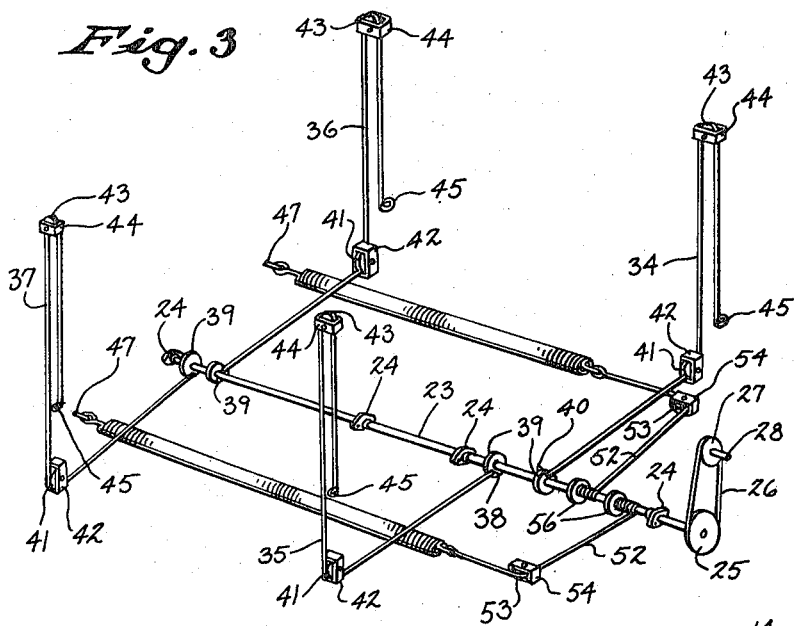
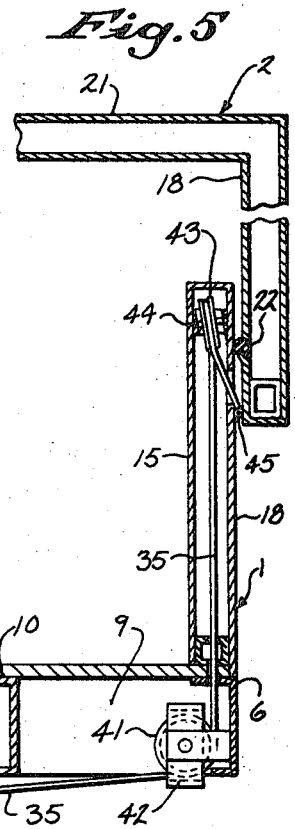
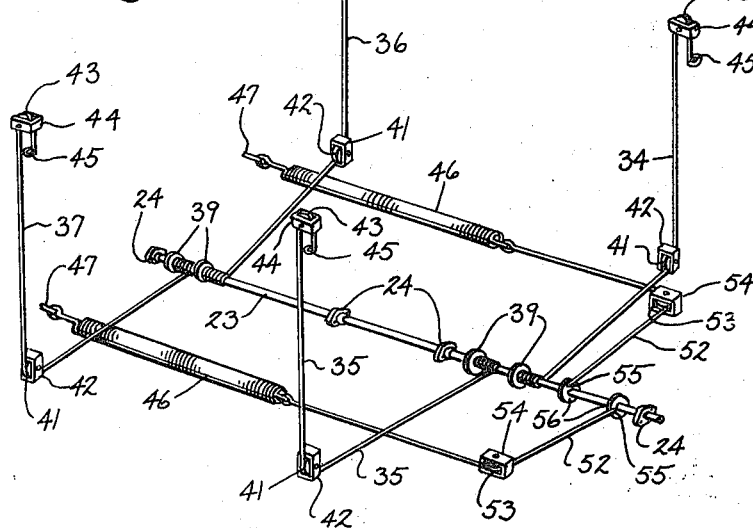
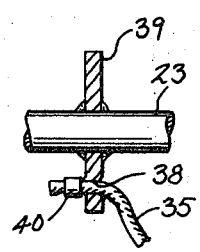
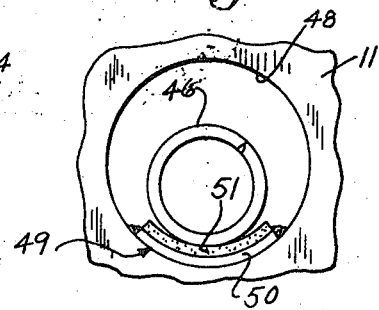

MECHANISM FOR RAISING AND LOWERING TELESCOPIC TRAVEL TRAILER

BACKGROUND OF THE INVENTION

A telescopic or high-low travel trailer includes a lower trailer section and an upper trailer section that is adapted to be moved vertically with respect to the lower section from a retracted position for transporting to a raised position for camping. The telescopic travel trailer provides substantial advantages over the conventional travel trailer in that it produces a lower profile for transporting which reduces the area of the trailer exposed to wind resistance and thereby minimizes the effects of dangerous wind gusts. In addition to the facilitating transporting on the road, the telescopic trailer, when in the lowered or transporting position, provides easy passage under low obstructions and enables the travel trailer to be stored in locations, such as garages, which would ordinarily not accommodate the standard travel trailer.

The upper trailer section can be raised and lowered between the transporting and camping positions by a mechanism, as disclosed in U.S. Pat. No. 3,542,415. In the mechanism shown in the aforementioned patent, a hand wheel is mounted for rotation on a column supported on the frame of the lower trailer section and rotation of the hand wheel is transmitted through a chain drive to rotate a shaft that extends longitudinally of the lower trailer section. Cables attached to the shaft are connected through a pulley system to the upper trailer section so that rotation of the shaft in one direction will wind the cables on the shaft to raise the upper trailer section, while lowering of the upper trailer section by gravity will cause the cables to unwind from the shaft.

Particularly with larger size trailers, the upper trailer section can have substantial weight, in the neighborhood of 600 to 700 lbs., and it therefore requires a substantial effort to rotate the hand wheel and raise the upper trailer section. Because of the substantial weight, a brake mechanism is associated with the hand wheel, and is arranged to automatically engage when the hand wheel is released so that the upper trailer section cannot freely fall by gravity to the lower position.

SUMMARY OF THE INVENTION

The invention relates to a mechanism for raising and lowering a telescopic travel trailer that incorporates a counterbalancing system to aid in raising the upper trailer section to the camping position. More specifically, a pair of springs are mounted on the frame of the lower trailer section beneath the floor. One end of each spring is connected to the frame, while the opposite end of each spring is connected through cables to the shaft which extends longitudinally of the frame. When the upper trailer section is in the lowered position, the springs are extended and as the upper trailer section is raised the force of the spring aids in urging the upper trailer section to the raised position.

The counterbalancing mechanism provided by the extension springs counterbalances a substantial portion of the weight of the upper trailer section so that the upper trailer section can be raised with considerably less effort.

As a further advantage, the counterbalancing springs prevent a fast release or fall of the upper trailer section by gravity when the hand wheel is released. As a fast descent of the upper trailer section is prevented, the brake mechanism normally associated with the hand wheel can be eliminated.

The counterbalancing mechanism also provides a safety factor in the event the upper trailer section is accidentally lowered when a person or object is in an interfering position within the trailer. Due to the counterbalancing effect of the springs, the upper trailer section can be held at any position with very little force, thereby preventing crushing of an object within the trailer if the upper trailer section is accidentally lowered.

Other objects and advantages will appear in the course of the following description.

DESCRIPTION OF THE DRAWINGS

The drawings illustrate the best mode presently contemplated of carrying out the invention.

FIG. 3 is a perspective view of the frame of the lower trailer section showing the upper trailer section in the lower position;

FIG. 4 is a view similar to FIG. 3 showing the upper trailer section in the raised position;

FIG. 5 is a vertical transverse section showing the upper trailer section in the raised position;

FIG. 6 is a sectional view taken along line 6—6 of FIG. 5 showing the attachment of a cable to the shaft; and FIG. 7 is a section taken along line 7—7 of FIG. 2.

Figure 1:
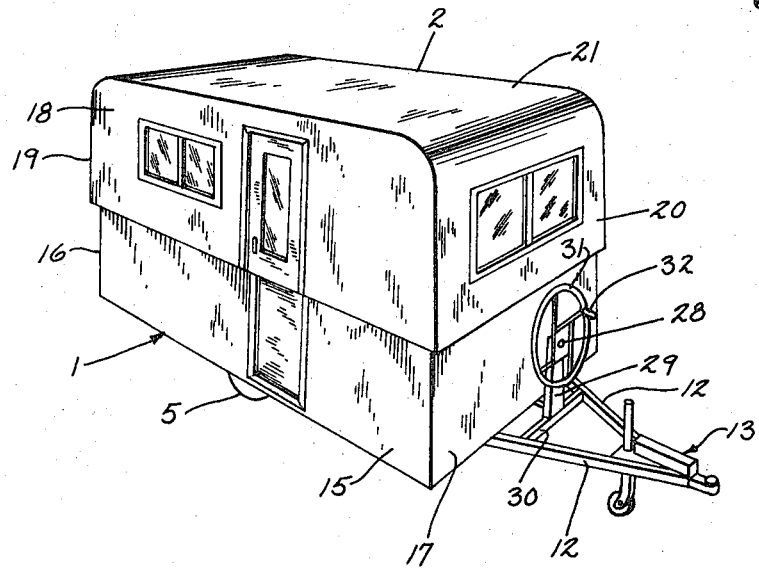
FIG. 1 is a perspective view of the telescopic travel trailer incorporating the raising and lowering mechanism of the invention, the upper section being shown in the raised position.
Figure 2:
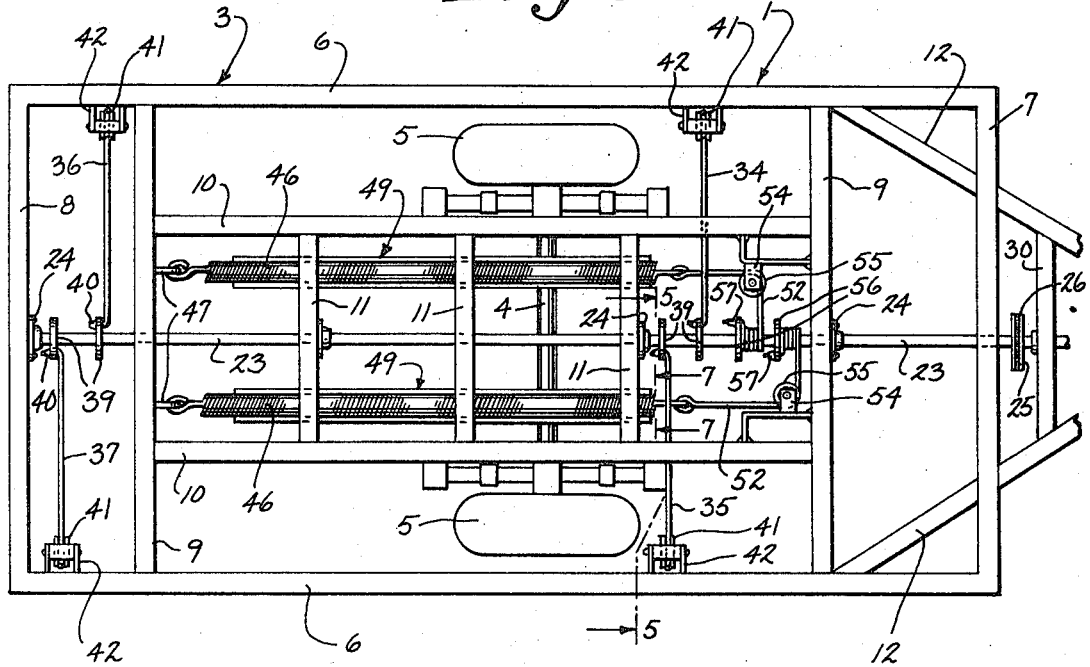
FIG. 2 is a plan view of the frame of the lower trailer section.

The drawings illustrate a telescopic travel trailer including a lower trailer section 1 and an upper trailer section 2 that is adapted to be moved vertically with respect to the lower section from a lower transporting position to an upper camping position. As best illustrated in FIGS. 3 and 4, the lower trailer section 1 includes a frame 3 and a drop axle 4 is mounted on the frame and carries a pair of wheels 5.

The frame 3 is composed of a pair of longitudinal side rails 6 which are connected at their front and rear ends by a front rail 7 and a rear rail 8, respectively. A pair of cross rails 9 are connected between the side rails 6, and longitudinal rails 10 are connected between cross rails 9 and are spaced inwardly of the side rail 6. Added reinforcement is provided for the longitudinal rails 10 by a series of cross member 11 which extend between the rails 10. A pair of diagonal beams 12 are connected to the forward cross rail 9 and to the front cross rail 7 and converge at a location at the front of the frame and provide a support for a hitch assembly 13 which is utilized to attach the trailer to a vehicle in the conventional manner.

The lower trailer section 1 also includes a floor 14 which is supported on the frame 3, and a pair of side walls 15, rear wall 16 and front wall 17 are mounted on the floor 14.

The upper trailer section 2, which is adapted to be moved vertically with respect to the lower trailer section, includes a pair of side walls 18 which are located outwardly of the side walls 15 of the lower trailer section and a rear wall 19 and front wall 20 which similarly are located outwardly of the respective rear wall 16, and front wall 17, of the lower trailer section. The upper trailer section also includes a roof 21 which is connected to the upper ends of the side walls 18 and rear wall 19 and front wall 20.

A seal assembly indicated generally by 22 is located in the space between the corresponding walls of the upper and lower trailer sections and serves to provide a seal between these sections to prevent the entry of foreign material into the interior of the trailer.

To raise and lower the upper trailer section 2 between the lowered transporting position and the upper camping position, a shaft 23 extends longitudinally of the frame 3 beneath the floor 14. The shaft 23 extends through suitable openings in front rail 7, cross rail 9 and cross members 11 and is journalled for rotation within a series of bearing blocks 24 mounted on the frame members. The forward end of shaft 23 carries a sprocket 25 which is connected by a chain drive 26 to a sprocket 27 mounted on stub shaft 28. Shaft 28 is journalled for rotation on the upper end of an A-shaped column 29 that is mounted on the cross member 30 of frame 3. A hand wheel 31 is connected to the shaft 28, and rotation of the hand wheel acts through the chain drive 26 to rotate the shaft 23.

A brake mechanism 32 similar to that disclosed in U.S. Pat. No. 3,542,415 can be utilized with the hand wheel 31, if desired.

A series of cables 34, 35, 36 and 37 interconnect the shaft with the upper trailer section. One end of each of the cables extends through an opening 38 in a disc 39 that is secured to shaft 23. As best illustrated in FIG. 6, the opening 38 is punched-out, resulting in a protruding flange on one side of the disc which aids in preventing withdrawal of the cable from the opening. The end of the cable is provided with a clamp 40 having a larger size than the opening 38 which prevents the cable from being withdrawn from the opening.

Each of the lifting cables 34-37 extends over a pulley 41 which is journalled in a bracket 42 connected to the side rail 6 of the frame. Each cable then travels upwardly and over an upper pulley 43 mounted on a bracket 44 attached to the upper trailer section and is deadended adjacent the lower edge of the upper trailer section, as indicated at 45. When the upper trailer section 2 is in the lower or transporting position, the deadend 45 will be located at a substantial distance beneath the pulley 43 and each of the cables 34-37 will be unwound from the shaft 23, as illustrated in FIG. 3. When it is desired to raise the trailer, the hand wheel 31 is rotated in a direction to wind the cables 34-37 on the shaft 23, thereby causing the upper trailer section to be elevated through deadend connections 45.

In accordance with the invention, a counterbalancing mechanism is employed which acts to urge the upper trailer section to the raised position and thereby aids in counterbalancing a portion of the weight of the upper trailer section. The counterbalancing mechanism includes a pair of extension springs 46 which are mounted on the frame 3 beneath the floor 14. As shown in FIGS. 3 and 4 the rear end of each spring is connected to an eyelet 47 attached to the cross rail 9 and the springs 46 extend through aligned openings 48 in the cross members 11. Each spring is supported on a guide bar assembly 49 which is located within the aligned openings 48 in the cross members 11. As best illustrated in FIG. 7, each guide bar 49 includes a rigid metal base 50 and a resilient upper layer 51 which supports the spring 46. The guide bar assemblies 49 provide a guide for the springs as they are moved between a contracted and extended position, and the resilient or soft surfaces 51 prevent rattling of the springs as the trailer is being transported.

The forward end of each spring is attached to one end of a cable 52, and cable 52 travels around pulley 53 mounted on bracket 54 attached to frame 3. The opposite end of each cable extends through a hole 55 in a disc 56 attached to the shaft 23. The discs 56 are similar in construction to the disc 39. To prevent withdrawal of the cable from the hole 55 in the disc 56, the end of the cable is provided with a clamp 57 having a larger size than hole 55.

When the upper trailer section is in the lowered position the springs 46 are in the extended position, and the cables 52 are wound on the shaft 23 as shown in FIG. 3. As the upper trailer section 2 is raised through operation of the hand wheel 31, the cables 34-37 will wind on shaft 23 and the force of the springs 46 will act to unwind the cables 52 from the shaft and provide a counterbalancing effect to urge the upper trailer section to the raised position, which is illustrated in FIG. 4.

While the drawings illustrate the use of extension springs 46 to provide the counterbalancing effect, it is contemplated that other resilient means can be utilized to urge or bias the upper trailer section to the raised position. However, the use of the extension springs 46 mounted beneath the floor 14 has the advantage in that springs of substantial length can be employed with the result that a greater spring force can be achieved than with springs arranged in other locations. Similarly, while the drawings illustrate the springs being connected to the shaft 23 to aid in raising trailer section, it is contemplated that the springs may be connected directly to the upper trailer section.

The counterbalancing effect achieved through use of the springs 46 has particular advantage in larger size trailers where the upper trailer section has substantial weight. With the biasing effect of the springs, the upper trailer section can be raised with very little effort. As a further advantage, the force of the springs will prevent the sudden fall or descent of the upper trailer section in the event the hand wheel is released, thereby eliminating the necessity of utilizing a brake mechanism, such as that illustrated at 32 with the hand wheel.

As a further advantage, the counterbalancing mechanism serves as a safety feature in that it will prevent complete collapse of the upper trailer section on a person or object accidentally located within the trailer when the upper trailer section is lowered. The trailer section can be maintained in any given position from within the trailer with very little force, thereby preventing crushing of ojbects within the trailer.

Various modes of carrying out the invention are contemplated as being within the scope of the following claims particularly pointing out and distinctly claiming the subject matter which is regarded as the invention.

I claim:

1. In a telescopic travel trailer, a lower trailer section, an upper trailer section mounted for vertical telescopic movement with respect to the lower section from a lower transporting position to an upper position, said lower trailer section including a frame and a floor supported by the frame, a shaft mounted for rotation with respect to the frame, said shaft disposed beneath the floor and extending longitudinally of the lower trailer section, means for rotating the shaft, flexible connecting means operably connecting the shaft and the upper trailer section for raising and lowering said upper trailer section in response to rotation of said shaft, and counterbalancing means mounted on the frame beneath the floor and operably connected to said shaft whereby the force of said counterbalancing means acts to rotate the shaft in a direction to move the upper trailer section from the lower to the upper position.

2. The trailer of claim 1, wherein the counterbalancing means comprises a coil spring disposed to be extended and contracted, said trailer including guide means for guiding the coil spring in extension and contraction, said guide means having a relatively soft, non-metallic surface to support the spring and thereby prevent rattling of the spring during transporting of the trailer.

3. The trailer of claim 1, wherein the counterbalancing means comprises a pair of coil springs each having one end secured to the frame, and cable means connecting the opposite end of each spring to said shaft, said springs extending longitudinally of the trailer.

4. The trailer of claim 1, wherein said means for rotating the shaft is manually operable and is located on the exterior of the trailer.

5. The trailer of claim 1, wherein the counterbalancing means comprises a spring having one end secured to the frame, and cable means connecting the opposite end of the spring to said shaft.

6. The trailer of claim 5, wherein said flexible connecting means is connected to the shaft in a manner whereby said flexible connecting means is wound on the shaft as the upper trailer section is moved from the lower to the upper position, and said cable means is connected to the shaft in a manner whereby said cable means is unwound from the shaft as the upper trailer section is moved from the lower to the upper position.

7. In a telescopic travel trailer, a lower trailer section, an upper trailer section mounted for vertical telescopic movement with respect to the lower section from a lower transporting position to an upper position, said lower trailer section including a frame and a floor supported by the frame, a shaft mounted for rotation with respect to the frame, said shaft disposed beneath the floor and extending longitudinally of the lower trailer section, manually operable means located on the exterior of the trailer for rotating the shaft, a first cable operably connecting the shaft and the upper trailer section for raising and lowering said upper trailer section in response to rotation of said shaft, spring means having one end secured to the frame, a second cable connecting the opposite end of the spring means to the shaft whereby the force of said spring means acts to rotate the shaft in a direction to move the upper trailer section from the lower to the upper position, one of said cables being connected to the shaft in a manner whereby it is wound on the shaft as the upper trailer section is moved from the lower position to the upper position and the other of said cables being connected to the shaft in a manner whereby it is unwound from the shaft as the upper trailer section is moved from the lower position to the upper position.

* * * * *